(12) United States Patent
Watanabe

(10) Patent No.: US 9,826,021 B2
(45) Date of Patent: Nov. 21, 2017

(54) COMMUNICATION APPARATUS AND METHOD FOR CONTROLLING THE SAME

(71) Applicant: CANON KABUSHIKI KAISHA, Tokyo (JP)

(72) Inventor: Kenta Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 14/523,717

(22) Filed: Oct. 24, 2014

(65) Prior Publication Data
US 2015/0120869 A1    Apr. 30, 2015

(30) Foreign Application Priority Data

Oct. 28, 2013  (JP) .................................. 2013-223526

(51) Int. Cl.
| | | |
|---|---|---|
| *G06F 15/16* | (2006.01) | |
| *H04L 29/08* | (2006.01) | |
| *H04W 4/00* | (2009.01) | |
| *H04W 76/02* | (2009.01) | |
| *H04N 1/00* | (2006.01) | |
| *H04W 92/18* | (2009.01) | |

(52) U.S. Cl.
CPC ......... *H04L 67/06* (2013.01); *H04N 1/00095* (2013.01); *H04W 4/00* (2013.01); *H04W 76/023* (2013.01); *H04W 92/18* (2013.01)

(58) Field of Classification Search
CPC ..... H04W 48/16; H04W 4/00; H04W 76/023; H04W 92/18; H04L 67/06; H04N 1/00095
See application file for complete search history.

(56) References Cited

U.S. PATENT DOCUMENTS

| | | | | |
|---|---|---|---|---|
| 2009/0022092 A1* | 1/2009 | MacInnis | ............... | H04W 84/12 370/328 |
| 2011/0016196 A1* | 1/2011 | Martin-Cocher | ....... | H04W 4/00 709/219 |
| 2011/0060999 A1* | 3/2011 | So | ........................ | G06F 9/4445 715/740 |
| 2011/0141293 A1* | 6/2011 | Yoneyama | ......... | H04N 1/00283 348/207.1 |

(Continued)

FOREIGN PATENT DOCUMENTS

JP    2013-187566 A    9/2013

*Primary Examiner* — Jonathan Bui
(74) *Attorney, Agent, or Firm* — Canon USA, Inc. I.P. Division

(57) ABSTRACT

A method for controlling a communication apparatus includes transmitting, before establishing a communication with an external apparatus, an advertisement signal for providing notification of an existence of the communication apparatus, and establishing a communication between the communication apparatus and a partner apparatus which has responded to the advertisement signal. The advertisement signal includes control information indicating whether to transmit a content in response to an operation on the communication apparatus or to transmit the content in response to an operation on the partner apparatus. After establishment of the communication between the communication apparatus and the partner apparatus, based on the control information included in the advertisement signal, processing for transmitting the content to the partner apparatus is controlled.

15 Claims, 13 Drawing Sheets

(56) References Cited

U.S. PATENT DOCUMENTS

| | | | |
|---|---|---|---|
| 2013/0128738 A1* | 5/2013 | Cohen | H04L 45/125 370/235 |
| 2013/0322276 A1* | 12/2013 | Pelletier | H04W 72/085 370/252 |
| 2014/0053173 A1* | 2/2014 | Oh | H04N 21/44218 725/12 |
| 2014/0068023 A1* | 3/2014 | Arickan | H04L 61/2015 709/220 |
| 2014/0153457 A1* | 6/2014 | Liu | H04W 52/0222 370/311 |
| 2014/0181302 A1* | 6/2014 | Sahoo | H04L 67/303 709/225 |
| 2014/0269464 A1* | 9/2014 | Park | H04W 48/16 370/311 |
| 2015/0036672 A1* | 2/2015 | Kim | H04W 48/16 370/338 |
| 2015/0207793 A1* | 7/2015 | Mohamed | H04L 63/166 726/6 |
| 2015/0382217 A1* | 12/2015 | Odio Vivi | H04B 17/336 370/252 |
| 2016/0014545 A1* | 1/2016 | Tian | H04W 8/005 455/41.2 |
| 2016/0183180 A1* | 6/2016 | Garcia Martin | H04W 48/18 370/328 |

* cited by examiner

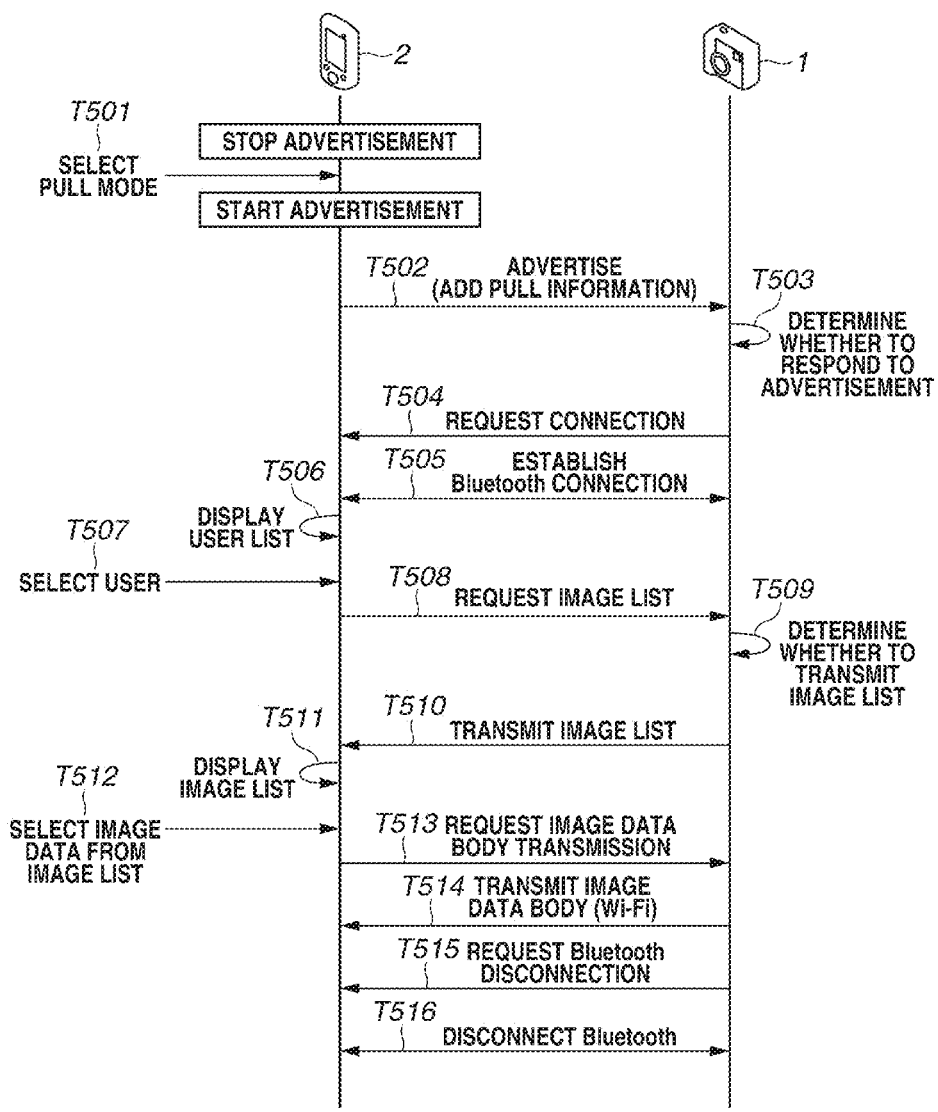

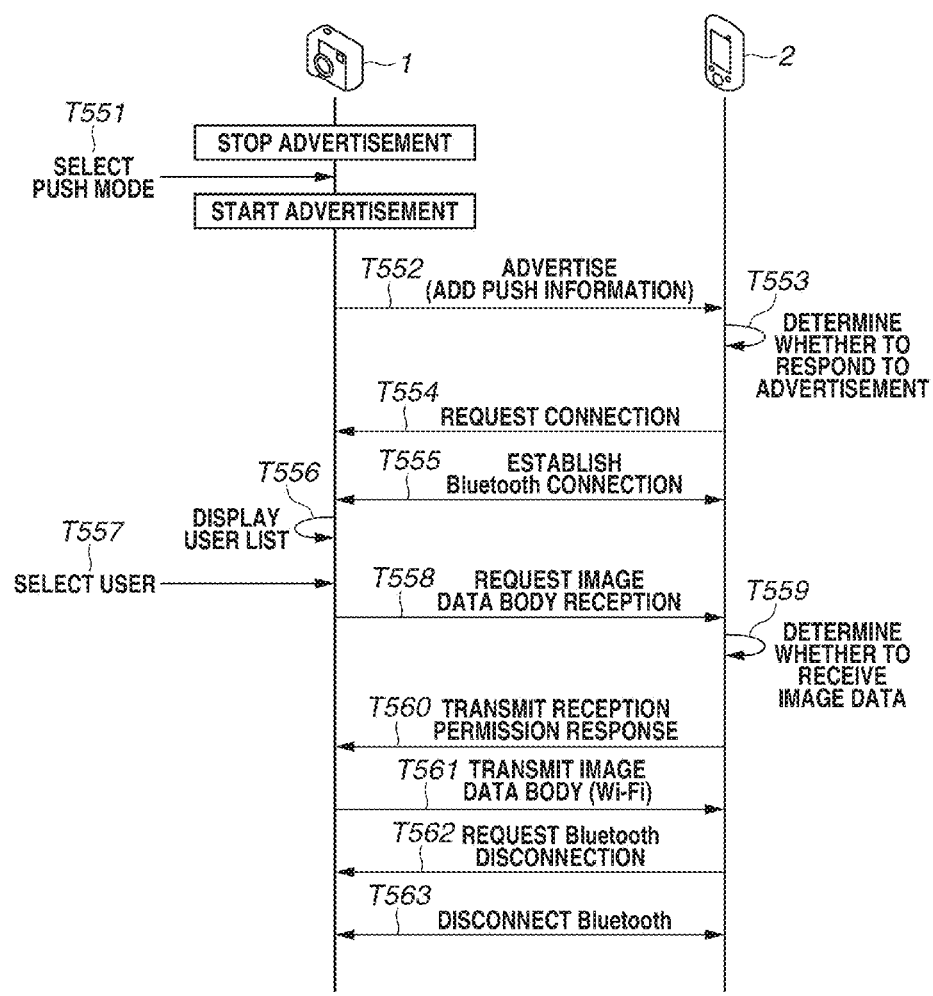

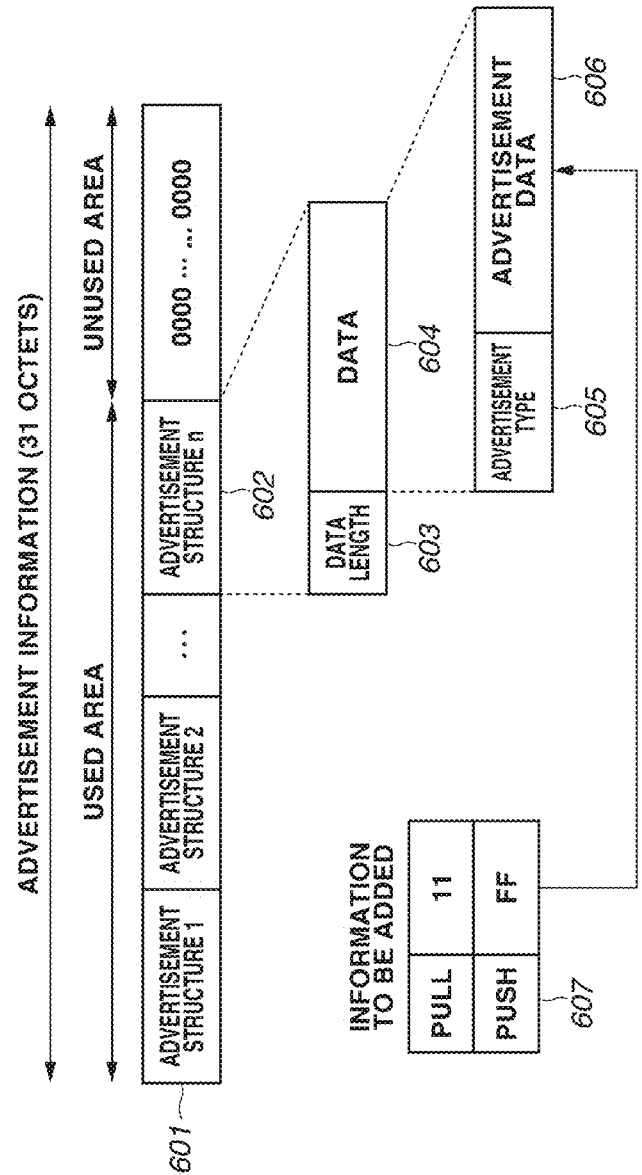

FIG.7

| | 702<br>SERIAL No. | 703<br>PERMISSION |
|---|---|---|
| 1 | 487B6AC12956 | PUSH ONLY |
| 2 | F5249B36C578 | PULL ONLY |
| 3 | 369BEF6F1250 | PUSH ONLY |
| 4 | DE5623246090 | PULL / PUSH |
| 5 | BB569021CD56 | PUSH ONLY |
| 6 | BC58142BCA23 | PULL / PUSH |

701

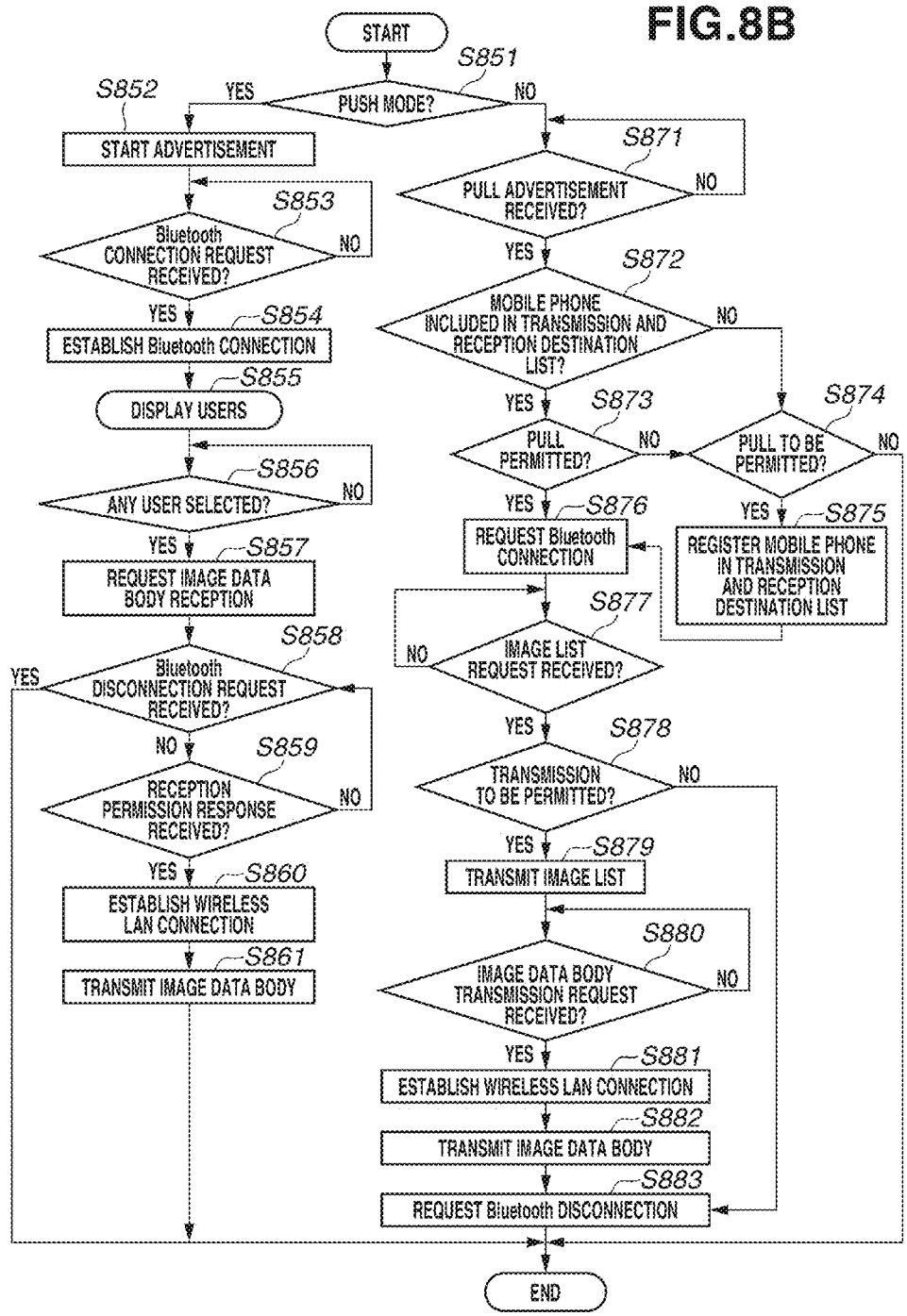

COMMUNICATION APPARATUS AND METHOD FOR CONTROLLING THE SAME

BACKGROUND OF THE INVENTION

Field of the Invention

The present invention relates to a technique for communicating with other apparatuses in a plurality of modes.

Description of the Related Art

In recent years, it has become common to transmit image data stored in a communication apparatus to other communication apparatuses through wireless communication. A known technique transmits image data more efficiently by using a plurality of different wireless communication methods.

There are two possible modes for transmitting image data: the Push mode and the Pull mode. In the Push mode, image data is transmitted to the reception side through an operation on the transmission side. In the Pull mode, image data is received from the transmission side through an operation on the reception side. Since an assumed use case is different between the two modes, it is desirable to prepare a communication sequence suitable for each of the modes.

SUMMARY OF THE INVENTION

According to an aspect of the present invention(s), a communication apparatus includes a transmission unit configured to, before establishing a communication with an external apparatus, transmit an advertisement signal for providing notification of an existence of the communication apparatus, a communication establishment unit configured to establish a communication with a partner apparatus which has responded to the advertisement signal, and a control unit configured to, after the communication with the partner apparatus is established, control processing for transmitting a content to the partner apparatus. The advertisement signal includes control information indicating whether to transmit a content in response to an operation on the communication apparatus or to transmit a content in response to an operation on the partner apparatus. Based on the control information included in the advertisement signal, the control unit controls the processing for transmitting the content to the partner apparatus. According to other aspects of the present invention(s), method(s) of controlling a communication apparatus, and computer-readable storage medium(s) storing a program that causes a computer to execute one of the method(s), are discussed herein.

Further features of the present invention(s) will become apparent from the following description of exemplary embodiments with reference to the attached drawings.

BRIEF DESCRIPTION OF THE DRAWINGS

FIGS. 5A and 5B are sequence diagrams illustrating communications between the digital camera and the mobile phone according to the first exemplary embodiment.

FIG. 6 is a block diagram illustrating an advertisement structure according to the first exemplary embodiment.

FIG. 7 illustrates an example of a transmission and reception destination list according to the first exemplary embodiment.

FIGS. 8A and 8B are flowcharts illustrating operations of the mobile phone and the digital camera according to the first exemplary embodiment.

DESCRIPTION OF THE EMBODIMENTS

Various exemplary embodiments, features, and aspects of the invention will be described in detail below with reference to the drawings.

Figure 1:
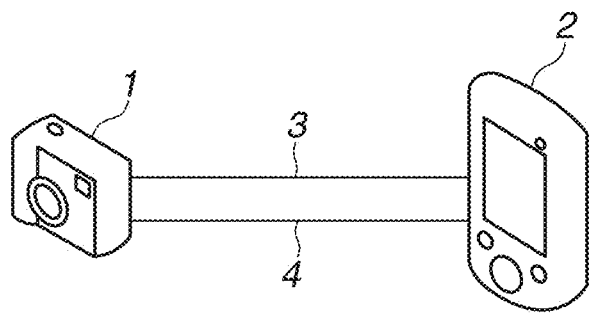
FIG. 1 illustrates a configuration of a system according to a first exemplary embodiment.

The configuration of a system according to a first exemplary embodiment of the present invention is illustrated in FIG. 1. The system according to the present exemplary embodiment includes a digital camera 1 and a mobile phone 2 as examples of communication apparatuses. The digital camera 1 and the mobile phone 2 can communicate with each other since they are connected by using a communication path 3 based on a wireless local area network (LAN) and a communication path 4 based on Bluetooth (registered trademark) which is able to operate on low consumption power.

An exemplary embodiment to be described below is an example of a method for realizing the present invention, and may be suitably modified or changed depending on apparatus configurations and various conditions according to the present invention. Exemplary embodiments may be suitably combined.

<Configuration of Digital Camera>

Figure 2:
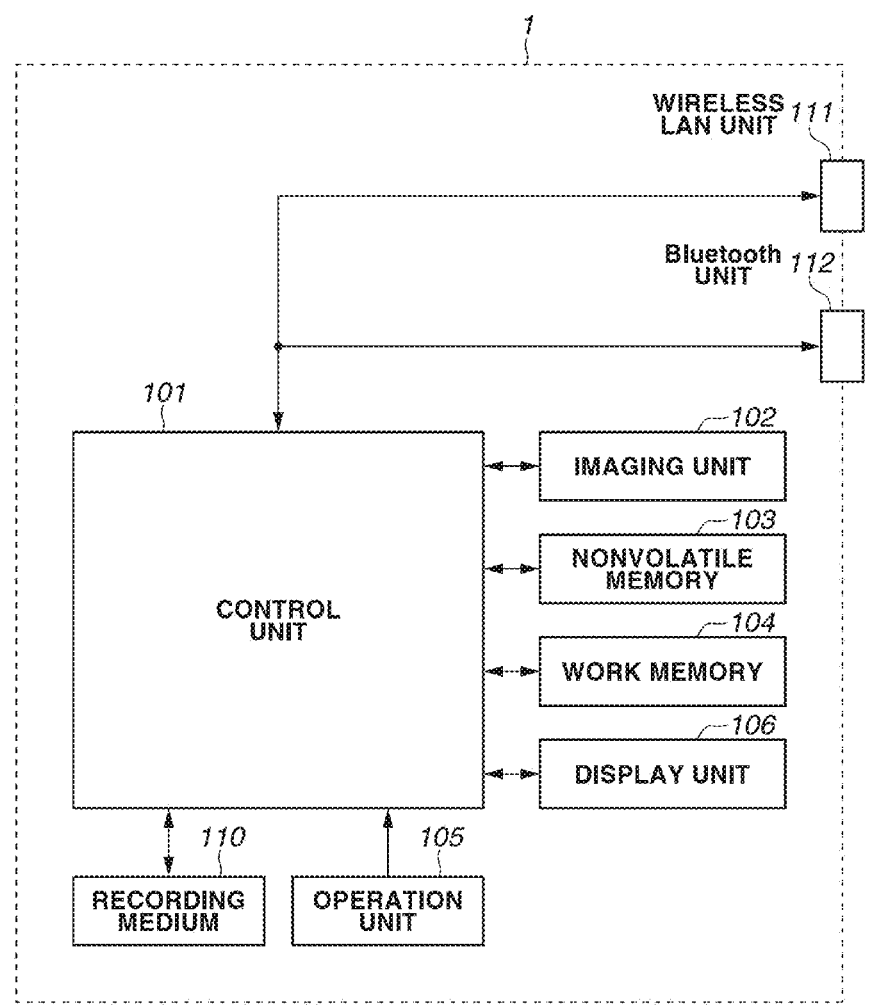
FIG. 2 is a block diagram illustrating a configuration of a digital camera according to the first exemplary embodiment.

FIG. 2 is a block diagram illustrating a configuration example of the digital camera 1 as an example of a communication apparatus according to the present exemplary embodiment. Although the digital camera 1 will be described below as an example of a communication apparatus, the communication apparatus is not limited thereto. For example, the communication apparatus may be a portable media player, and an information processing apparatus such as a tablet device and a personal computer.

A control unit 101 controls each unit of the digital camera 1 according to an input signal and a program (described below). Although the control unit 101 controls the entire apparatus, the configuration is not limited thereto. The entire apparatus may be controlled by a plurality of hardware components in charge of different processing.

An imaging unit 102 converts object light formed by a lens included in the imaging unit 102 into an electric signal, performs noise reduction processing on the signal, and outputs resultant digital data as image data. After the image data generated by the imaging unit 102 is stored in a buffer memory, the control unit 101 performs a predetermined calculation on the data, and records it on a recording medium 110.

A nonvolatile memory 103 is an electrically erasable writable nonvolatile memory for storing programs (described below) to be performed by the control unit 101.

A work memory 104 is used as a buffer memory temporarily storing the image data generated by the imaging unit 102, an image display memory for a display unit 106, and a work area for the control unit 101.

An operation unit 105 is used to receive an instruction to the digital camera 1 from a user. The operation unit 105 includes operation members, such as a power button for issuing an instruction to turn on and off a power supply of the digital camera 1, a release switch for issuing an instruction to capture an image, and a playback button for issuing an instruction to reproduce image data. The operation unit 105 further includes a touch panel formed on the display unit 106 (described below). The release switch includes a switch (SW) 1 and a SW 2. When the release switch is half-pressed, the SW 1 turns ON. In this state, the digital camera 1 receives an instruction to perform imaging preparations, such as automatic focus (AF) processing, automatic exposure (AE) processing, automatic white balance (AWB) processing, and electronic flash preliminary emission (EF) processing. When the release switch is full-pressed, the SW2 turns ON. In this state, the digital camera 1 receives an instruction for capturing an image.

The display unit 106 displays a view finder image during image capturing, displays data of an captured image, and displays texts for interactive operations. The digital camera 1 does not necessarily have to include the display unit 106. The digital camera 1 has only to be connectable with the display unit 106 provided internally or externally, and to include at least a display control function of controlling display of the display unit 106.

The recording medium 110 can record image data output from the imaging unit 102. The recording medium 110 may be detachably attached to the digital camera 1, or built in the digital camera 1. That is, the digital camera 1 has only to be provided with at least a unit for accessing the recording medium 110.

A wireless LAN unit 111 is an interface for connecting with an external apparatus. The digital camera 1 according to the present exemplary embodiment is able to exchange data with an external apparatus via the wireless LAN unit 111. The control unit 101 realizes wireless communication with an external apparatus by controlling the wireless LAN unit 111.

The digital camera 1 according to the present exemplary embodiment can operate as a slave apparatus in an infrastructure mode. When operating as a slave apparatus, the digital camera 1 can connect with a peripheral access point (hereinafter referred to as an AP) to participate in a network formed by the AP. Although the digital camera 1 according to the present exemplary embodiment is a type of an AP, it can operate as a simplified AP (hereinafter referred to as a simple AP) having limited functions, such as a micro AP. The AP according to the present exemplary embodiment is an example of a relay apparatus. When the digital camera 1 operates as a simple AP, the digital camera 1 itself forms a network. Apparatuses around the digital camera 1 are able to recognize the digital camera 1 as an AP to participate in the network formed by the digital camera 1. A program for operating the digital camera 1 as described above is assumed to be stored in the nonvolatile memory 103.

Although the digital camera 1 according to the present exemplary embodiment is a type of an AP, it is a simple AP that does not have a gateway function of transferring data received from a slave apparatus to an Internet provider. Therefore, even if the digital camera 1 receives data from other apparatuses participating in the network formed by the digital camera 1 itself, it cannot transfer the data to a network, such as the Internet.

A Bluetooth (registered trademark) unit 112 is also an interface for connecting the digital camera 1 with an external apparatus. Similarly to the wireless LAN unit 111, the digital camera 1 according to the present exemplary embodiment can exchange data with an external apparatus via the Bluetooth (registered trademark) unit 112. The control unit 101 realizes wireless communication with an external apparatus by controlling the Bluetooth (registered trademark) unit 112.

This completes descriptions of the digital camera 1. The mobile phone 2 as an example of an external apparatus will be described below.

<Configuration of Mobile Phone>

Figure 3:
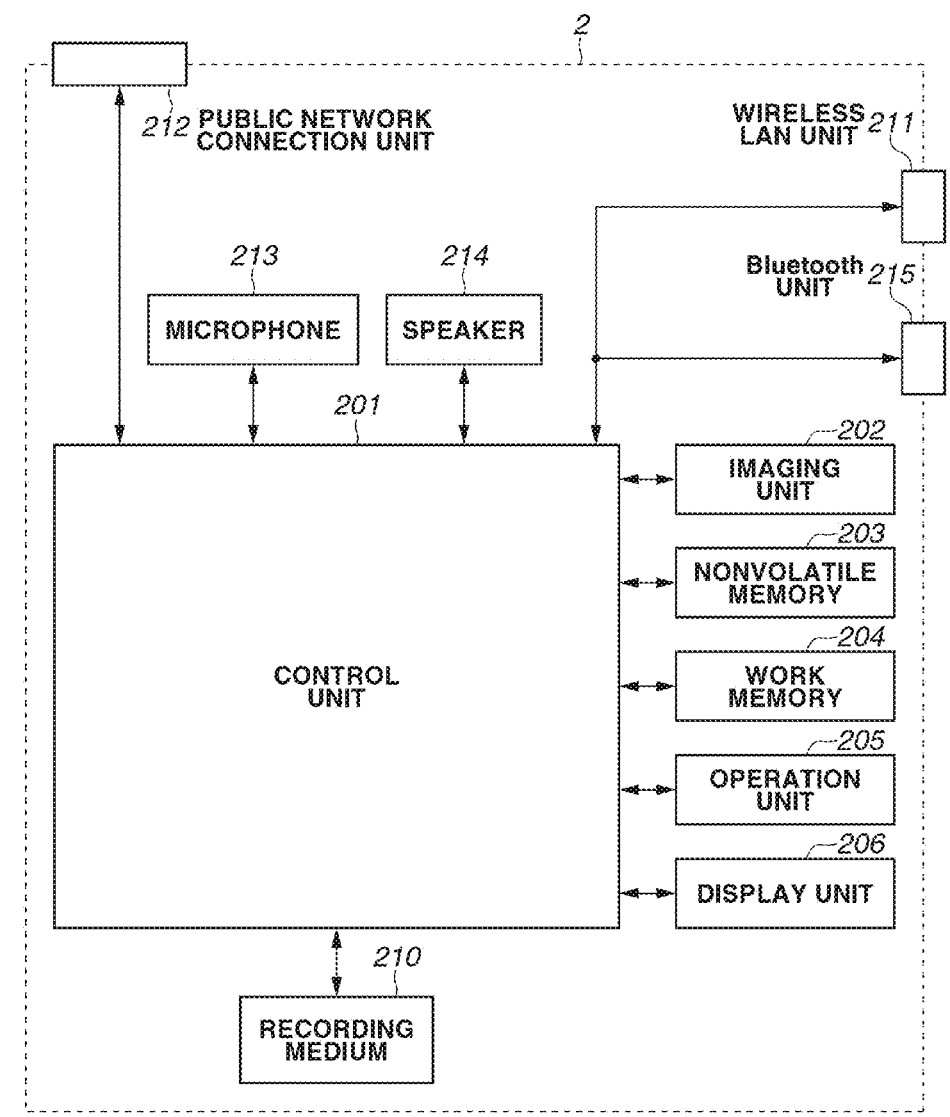
FIG. 3 is a block diagram illustrating a configuration of a mobile phone according to the first exemplary embodiment.

FIG. 3 is a block diagram illustrating a configuration example of the mobile phone 2 as an example of a communication apparatus according to the present exemplary embodiment. Although the mobile phone 2 is described as an example of a communication apparatus, the communication apparatus is not limited thereto. For example, the communication apparatus may be a digital camera, a portable media player, and an information processing apparatus such as a tablet device, a personal computer, and a smartphone, which have a radio function.

A control unit 201 controls each unit of the mobile phone 2 according to an input signal and a program (described below). Although the control unit 201 controls the entire apparatus, the configuration is not limited thereto. The entire apparatus may be controlled by a plurality of hardware components in charge of different processing.

An imaging unit 202 converts object light formed by a lens included in the imaging unit 202 into an electric signal, performs noise reduction processing on the signal, and outputs resultant digital data as image data. After the image data generated by the imaging unit 202 is stored in a buffer memory, the control unit 201 performs a predetermined calculation on the data, and records it on a recording medium 210.

A nonvolatile memory 203 is an electrically erasable writable nonvolatile memory for storing various programs to be performed by the control unit 201. A program for communicating with the digital camera 1 is also assumed to be stored in the nonvolatile memory 203, and installed as a camera communication application. Processing of the mobile phone 2 according to the present exemplary embodiment is implemented by reading a program provided by the camera communication application. The camera communication application is assumed to include programs for using basic functions of an operating system (OS) installed in the mobile phone 2. The OS of the mobile phone 2 may include programs for implementing processing according to the present exemplary embodiment.

A work memory 204 is used as a buffer memory for temporarily storing the image data generated by the imaging unit 202, an image display memory for a display unit 206, and a work area for the control unit 201.

An operation unit 205 is used to receive an instruction to the mobile phone 2 from a user. The operation unit 205 includes operation members, such as a power button for issuing an instruction to turn on and off a power supply of the mobile phone 2 and a touch panel formed on the display unit 206.

The display unit 206 displays image data, and displays texts for interactive operations. The mobile phone 2 does not necessarily have to include the display unit 206. The mobile phone 2 has only to be connectable with the display unit 206, and include at least a display control function of controlling display of the display unit 206.

The recording medium 210 can record image data output from the imaging unit 202. The recording medium 210 may be detachably attached to the mobile phone 2, or built in the mobile phone 2. That is, the mobile phone 2 has only to be provided with at least a unit for accessing the recording medium 210.

A wireless LAN unit 211 is an interface for connecting with an external apparatus. The mobile phone 2 according to the present exemplary embodiment can exchange data with an external apparatus via the wireless LAN unit 211. The control unit 201 realizes wireless communication with an external apparatus by controlling the wireless LAN unit 211. The mobile phone 2 according to the present exemplary embodiment can operate at least as a slave apparatus in an infrastructure mode, and participate in a network formed by peripheral APs.

A Bluetooth (registered trademark) unit 215 is also an interface for connecting with an external apparatus. Similarly to the wireless LAN unit 211, the mobile phone 2 according to the present exemplary embodiment can exchange data with an external apparatus via the Bluetooth (registered trademark) unit 215. The control unit 201 realizes wireless communication with an external apparatus by controlling the Bluetooth (registered trademark) unit 215.

A public network connection unit 212 is an interface used to perform public wireless communication. The mobile phone 2 enables a user to make a telephone call and perform data communication with other apparatuses via the public network connection unit 212. In the case of a telephone call, the control unit 201 inputs and outputs an audio signal via a microphone 213 and a speaker 214, respectively. In the present exemplary embodiment, the public network connection unit 212 includes an interface for performing 3rd Generation (3G) communication. The communication method is not limited to 3G. Long Term Evolution (LTE), Worldwide Interoperability for Microwave Access (Wi-MAX), Asymmetric Digital Subscriber Line (ADSL), Fiber To The Home (FTTH), and other 4th Generation (4G) communication methods may be used. The wireless LAN unit 211 and the public network connection unit 212 do not necessarily have to be configured by independent hardware, and may be configured, for example, by one antenna. This completes descriptions of the mobile phone 2.

<Transmission Modes>

Figure 4A:
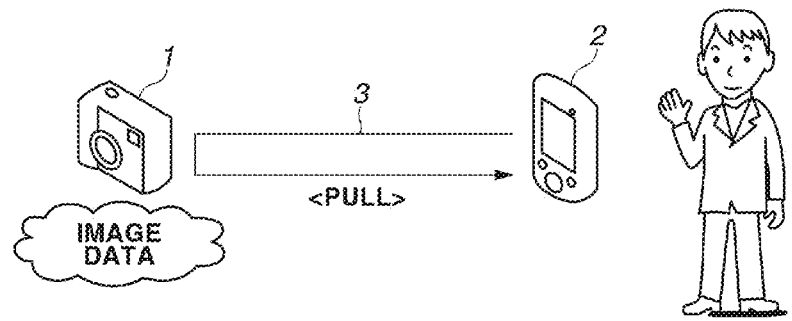
FIGS. 4A and 4B illustrate assumed use cases according to the first exemplary embodiment.

The present exemplary embodiment assumes two transmission modes: the Pull mode and the Push mode. FIG. 4A is a schematic view illustrating the Pull mode in which a Pull operation (hereafter referred to as Pull) is performed. In the Pull mode, the mobile phone 2 accesses the digital camera 1, and the user of the mobile phone 2 performs an operation for referring to image data stored in the digital camera 1 and acquiring desired image data. In the Pull mode, the digital camera 1 serves as the transmission side, and the mobile phone 2 serves as the reception side. In the Pull mode, since the mobile phone 2 performs control for accessing image data stored in the digital camera 1, it is desirable for the digital camera 1 to determine whether to permit access from the mobile phone 2.

Figure 4B:
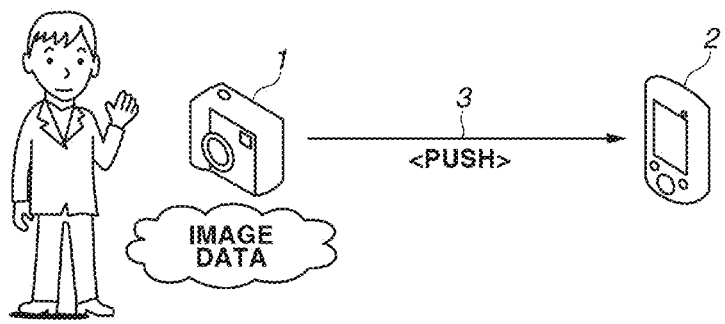

FIG. 4B is a schematic view illustrating the Push mode in which a Push operation (hereafter referred to as Push) is performed. Push refers to an operation performed by a user of the digital camera 1 to voluntarily transmit image data to the mobile phone 2. Also in this mode, similarly to the Pull mode, the digital camera 1 serves as the transmission side, and the mobile phone 2 serves as the reception side. In the Push mode, since the transmission side voluntarily transmits image data to the reception side, it is desirable for the reception side to determine whether to receive image data.

As described above, the present exemplary embodiment provides two different (Pull and Push) transmission modes. It is necessary to take various matters into consideration depending on the mode. Specific operations will be described below, focusing on the differences in operations between the Pull and the Push modes.

<Operation Sequence>

Data communication between the digital camera 1 and the mobile phone 2 according to the present exemplary embodiment will be described below. Descriptions will be made separately for the Pull and the Push modes.

<Sequence in Pull Mode>

FIG. 5A is a sequence diagram illustrating the Pull mode. In the present exemplary embodiment, the mobile phone 2 serves as the image data reception side, and the digital camera 1 serves as the image data transmission side. This sequence diagram is on the premise that the Bluetooth (registered trademark) units 112 and 215 and the wireless LAN units 111 and 211 of the digital camera 1 and the mobile phone 2 are operative, and no connection has been established therebetween.

In a phase from timing T501 to T505, the digital camera 1 detects a Pull request transmitted from the mobile phone 2, and establishes a Bluetooth (registered trademark) connection with the mobile phone 2.

Figure 10A:
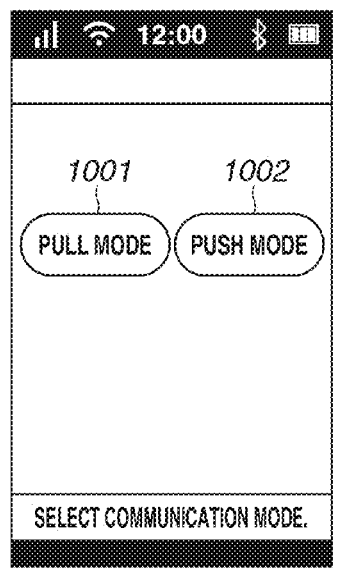
FIGS. 10A to 10E illustrate examples of display screens of the mobile phone according to the first exemplary embodiment.

Each of the digital camera 1 and the mobile phone 2 according to the present exemplary embodiment can shift to the Pull mode in which Pull mode communication is possible, and to the Push mode in which Push mode communication is possible. At timing T501, the control unit 201 displays a screen for selecting the Pull or the Push mode on the display unit 206 of the mobile phone 2, allowing the user to select either of the modes. An example of the screen at this timing is illustrated in FIG. 10A. This sequence will be described below on the assumption that the Pull mode has been selected.

At timing T502, the mobile phone 2 starts advertisement via the Bluetooth (registered trademark) unit 215. In advertisement, the mobile phone 2 broadcasts, without specifying a partner apparatus, an advertisement signal (hereinafter referred to also as advertisement) which is a notification signal for notifying peripheral apparatuses of the existence of the mobile phone 2. Advertisement information transmitted in this case includes Pull information and the serial number of the mobile phone 2. The Pull information refers to information used by other apparatuses to recognize that the sender of advertisement is in the Pull mode. The specific configuration of the advertisement information will be described below.

At timing T503, the digital camera 1 detects the advertisement of the mobile phone 2 via the Bluetooth (registered trademark) unit 112, and determines whether to respond to the advertisement. The digital camera 1 refers to the advertisement information, and, when the Pull information is included in the advertisement information, recognizes that the mobile phone 2 is in the Pull mode. The digital camera 1 according to the present exemplary embodiment determines whether to respond to the advertisement including the Pull information, by using a transmission and reception destination list. The transmission and reception destination list will be described below.

When the digital camera 1 determines to respond to the advertisement, at timing T504, the digital camera 1 transmits a Bluetooth (registered trademark) connection request to the mobile phone 2 via the Bluetooth (registered trademark) unit 112. The user name of the digital camera 1 is included in the Bluetooth (registered trademark) connection request.

When the mobile phone 2 receives the Bluetooth (registered trademark) connection request via the Bluetooth (registered trademark) unit 215, at timing T505, a Bluetooth (registered trademark) connection is established between the mobile phone 2 and the digital camera 1. This completes descriptions of the sequence until a Bluetooth (registered trademark) connection is established.

Processing in a phase from timing T506 to T511 during which the mobile phone 2 receives an image list from the digital camera 1 will be described below.

Figure 10B:
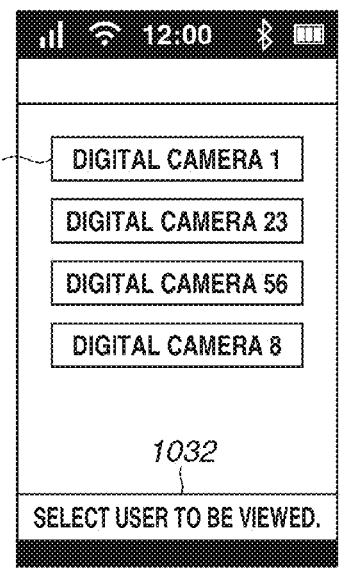

At timing T506, the mobile phone 2 displays on the display unit 206 a list of user names of devices which have responded to the advertisement performed by the mobile phone 2 at timing T502 and have established a Bluetooth (registered trademark) connection at timing T505. An example of screen display is illustrated in FIG. 10B. The user names are included in the Bluetooth (registered trademark) connection request.

At timing T507, the user of the mobile phone 2 selects a target user name for Pull from the user name list displayed on the display unit 206 of the mobile phone 2. In this sequence, the user of the digital camera 1 is assumed to be selected. The device corresponding to the selected user name is recognized as a destination for requesting an image list.

At timing T508, the mobile phone 2 transmits a request for an image list to the digital camera 1 via the Bluetooth (registered trademark) unit 215.

At timing T509, the digital camera 1 which has received the request for an image list determines whether to transmit the image list stored in the digital camera 1 to the mobile phone 2. In the present exemplary embodiment, the digital camera 1 displays a dialog on the display unit 106, and determines whether to permit the transmission based on a user operation on the digital camera 1.

When the user of the digital camera 1 permits the transmission of the image list, at timing T510, the digital camera 1 transmits the image list to the mobile phone 2 via the Bluetooth (registered trademark) unit 112. As the image list, for example, a thumbnail list of image data stored in the digital camera 1, a file name list of image files, or a list of other image-related meta data can be used. At timing T510, the digital camera 1 sends only supplementary information such as thumbnails, and does not send an original image (image data body).

Figure 10C:
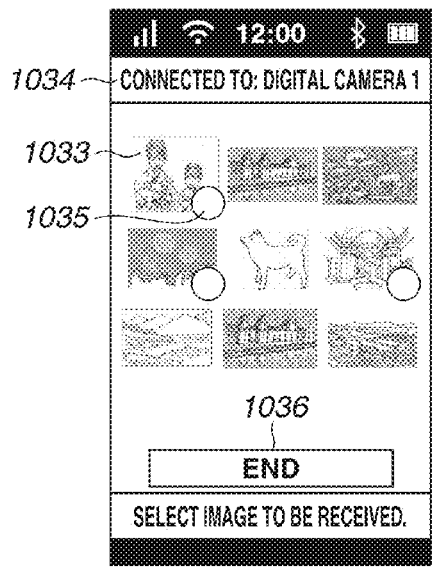

At timing T511, the mobile phone 2 receives the image list via the Bluetooth (registered trademark) unit 215, and displays it on the display unit 206. An example of display at this timing is illustrated in FIG. 10C. In the example illustrated in FIG. 10C, the mobile phone 2 receives a thumbnail list as an image list, and displays it.

Processing in a phase from timing T512 to T516 during which the mobile phone 2 transmits a request for image data body to the digital camera 1 and then receives it from the digital camera 1 will be described below.

At timing T512, the user of the mobile phone 2 performs an operation for selecting, from the thumbnail list displayed at timing T511, target image data of which the main body is to be received.

At timing T513, the mobile phone 2 transmits an image data body transmission request to the digital camera 1 via the Bluetooth (registered trademark) unit 215. This request includes information for identifying the image data selected at timing T512. As this information, for example, a file name, file identification (ID) information, an object identifier (ID) temporarily assigned for communication can be used.

At timing T514, the digital camera 1 which has received the image data body transmission request performs processing for transmitting the image data body to the mobile phone 2. In the present exemplary embodiment, since the image data body has a large size in comparison with the thumbnail, wireless LAN is used to transmit the image data body instead of Bluetooth (registered trademark). Processing at timing T514 will be described in detail below.

At timing T514, the digital camera 1 activates its simple AP to form a wireless LAN network. Then, the digital camera 1 transmits the service set identifier (SSID) and the encryption key of the wireless LAN network to the mobile phone 2 via the Bluetooth (registered trademark) unit 112, and searches for the mobile phone 2 by using the wireless LAN unit 111. Upon reception of the SSID and the encryption key, the mobile phone 2 participates in the wireless LAN network of the received SSID, and responds to the search by the digital camera 1. The digital camera 1 and the mobile phone 2 establish a wireless LAN connection through the above-described processing. Then, the digital camera 1 transmits the image data body to the mobile phone 2 via the wireless LAN unit 111. When the digital camera 1 determines that the transmission has been completed, it disconnects the wireless LAN. Processing from when the simple AP is activated until when the wireless LAN connection is established also applies to the sequence to be described below.

The timing at which the digital camera 1 transmits the SSID and the encryption key to the mobile phone 2 via the Bluetooth (registered trademark) unit 112 is not limited to the timing according to the present exemplary embodiment. For example, the SSID and the encryption key may be transmitted at timing T505 or at timing before the simple AP is activated at timing T514.

At timing T515, the digital camera 1 transmits a Bluetooth (registered trademark) disconnection request to the mobile phone 2.

At timing T516, the Bluetooth (registered trademark) connection between the digital camera 1 and the mobile phone 2 is disconnected. This completes descriptions of the image transmission sequence in the Pull mode.

<Sequence in Push Mode>

The sequence in the Push mode will be described below with reference to FIG. 5B. Similarly to the example in the Pull mode, the mobile phone 2 serves as the image data reception side, and the digital camera 1 serves as the image data transmission side. This sequence diagram is on the premise that the Bluetooth (registered trademark) units 112 and 215 and the wireless LAN units 111 and 211 of the digital camera 1 and the mobile phone 2 are operative, and no connection has been established therebetween at this timing.

Figure 9A:
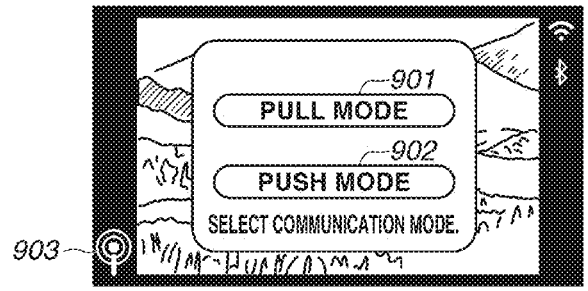
FIGS. 9A to 9D illustrate examples of display screens of the digital camera according to the first exemplary embodiment.

At timing T551, the digital camera 1 displays on the display unit 106 a screen for selecting the Pull mode or the Push mode through a user operation. An example of screen display is illustrated in FIG. 9A. This sequence will be described below on the assumption that the Push mode has been selected through a user operation.

At timing T552, the digital camera 1 starts advertisement via the Bluetooth (registered trademark) unit 112. Push information and the serial number of the digital camera 1 are included in the advertisement information to be transmitted. The Push information refers to information used by other apparatuses to recognize that the sender of advertisement is in the Push mode. The configuration of the advertisement information will be described below. The Push mode greatly differs from the above-described Pull mode in that advertisement is performed by the digital camera 1 which is the sender of image data. This difference arises from the difference between use cases of the Pull and the Push modes. In the Pull mode, a use case where the user on the image data reception side receives image data on its own initiative is assumed. Therefore, advertisement to be used as a trigger for starting communication is performed also on the reception side. On the other hand, in the Push mode, a use case where the user on the image data transmission side transmits image data on its own initiative is assumed. Therefore, advertisement to be used as a trigger for starting communication is performed also on the transmission side.

At timing T553, the digital camera 1 detects the advertisement of the mobile phone 2. Based on the Push information included in the advertisement information, the mobile phone 2 recognizes that the digital camera 1 is in the Push mode. Then, the mobile phone 2 determines whether to respond to the advertisement. The transmission and reception destination list used to perform this determination will be described below.

At timing T554, when the mobile phone 2 determines to respond to the advertisement, the mobile phone 2 transmits a Bluetooth (registered trademark) connection request to the digital camera 1 via the Bluetooth (registered trademark) unit 215. The user name of the mobile phone 2 is included in the Bluetooth (registered trademark) connection request.

When the digital camera 1 receives the Bluetooth (registered trademark) connection request via the Bluetooth (registered trademark) unit 112, at timing T555, a Bluetooth (registered trademark) connection is established between the mobile phone 2 and the digital camera 1.

Figure 9B:
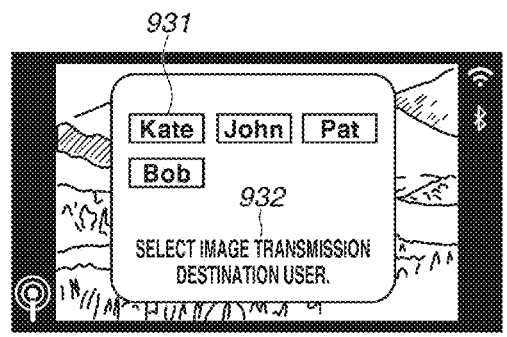

At timing T556, the digital camera 1 displays on the display unit 106 a list of user names of devices which have responded to the advertisement performed by the digital camera 1 at timing T552 and have established a Bluetooth (registered trademark) connection at timing T555. The user names are included in the Bluetooth (registered trademark) connection request. An example of display at this timing is illustrated in FIG. 9B.

At timing T557, the user of the digital camera 1 selects a target user name for Push from the user name list displayed on the display unit 106 of the digital camera 1. The device corresponding to the selected user name is recognized as a destination for transmitting image data.

At timing T558, the digital camera 1 transmits an image data body reception request to the mobile phone 2 via the Bluetooth (registered trademark) unit 112. Information for identifying the image data to be transmitted is included in the image data body reception request. Image data to be transmitted to the mobile phone 2 in Push is selected before timing T551, and the relevant information is prestored in the digital camera 1. A screen for selecting the image data to be transmitted may be displayed after selection of the image data transmission destination at timing T557.

Figure 10D:
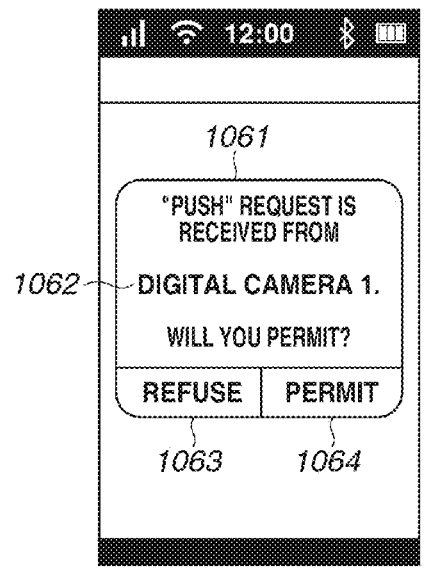

At timing T559, the mobile phone 2 which has received the image data body reception request determines whether to receive the image data. In the present exemplary embodiment, the mobile phone 2 displays a dialog on the display unit 206 to determine whether the image data is to be received based on a user operation on the mobile phone 2. An example of the dialog is illustrated in FIG. 10D.

At timing T560, the mobile phone 2 transmits a reception permission response to the digital camera 1 via the Bluetooth (registered trademark) unit 215.

At timing T561, the digital camera 1 transmits the image data to the mobile phone 2 via wireless LAN communication. Specifically, when the reception permission response from the mobile phone 2 indicates permission, at timing T561, the digital camera 1 activates its simple AP to establish a wireless LAN connection with the mobile phone 2. Processing flow until the connection is established is similar to that of the sequence illustrated in FIG. 5A. Then, the digital camera 1 transmits the image data body to the mobile phone 2. When the digital camera 1 determines that the transmission has been completed, it disconnects the wireless LAN connection.

At timing T562, the mobile phone 2 transmits a Bluetooth (registered trademark) disconnection request to the digital camera 1.

At timing T563, the Bluetooth (registered trademark) connection between the digital camera 1 and the mobile phone 2 is disconnected. This completes descriptions of the image transmission sequence in the Push mode.

<Configuration of Advertisement Information>

The advertisement information transmitted at timing T502 and T552 will be described in detail below. As described above, the Pull information or the Push information is included in the advertisement information according to the present exemplary embodiment. A configuration example of the advertisement information is illustrated in FIG. 6.

The advertisement information is configured in units of packets 601, and includes a plurality of advertisement structures. Such a configuration of the advertisement information is defined by the Bluetooth (registered trademark) Special Interest Group (SIG). This advertisement structure 602 includes a data length portion 603 and a data portion 604. The data portion 604 further includes an advertisement type portion 605 and an advertisement data portion 606.

One of the advertisement structures is used for providing notification of a service. When performing transmission and reception of an image, the digital camera 1 and the mobile phone 2 according to the present exemplary embodiment use a service for transmitting a file (hereinafter referred to as a file transmission service). Each of the digital camera 1 and the mobile phone 2 is assumed to recognize an ID which indicates this service.

When providing notification of the service, a value indicating the service is input to the advertisement type portion 605. An ID indicating the file transmission service is input to the advertisement data portion 606. Thus, the advertisement information can include service information. In the present exemplary embodiment, the service to be advertised is the file transmission service regardless of the Pull mode or the Push mode.

A general Bluetooth (registered trademark) device uses not all of the advertisement structures included in the packet 601. Therefore, in the present exemplary embodiment, one of unused advertisement structures is used for the Pull information indicating that the communication apparatus is in the Pull mode or the Push information indicating that the communication apparatus is in the Push mode.

More specifically, a value indicating a vendor-specific type (which is the hexadecimal number "FF" for Bluetooth (registered trademark)) is input to the advertisement type portion 605. Information indicating the Push mode or the Pull mode is further input to the advertisement data portion 606. To determine the Pull mode or the Push mode, the digital camera 1 and the mobile phone 2 prestore the correspondences between the modes and the bit values as illustrated in a table 607. Then, the value for the advertisement data portion 606 is determined according to the table 607. In the present exemplary embodiment, the Pull mode is indicated by the hexadecimal number "11", and the Pull mode is indicated by the hexadecimal number "FF".

As described above, by adding the Pull information or the Push information to the advertisement information, the mode can be determined on the side which has detected advertisement, and processing suitable for the mode can be performed.

<Determination Procedures Based on Transmission and Reception Destination List>

Processing for determining whether to respond to advertisement at timing T503 and T553 will be described in detail below. Each of the digital camera 1 and the mobile phone 2 includes a transmission and reception destination list 701, as illustrated in FIG. 7. The transmission and reception destination list 701 is recorded in the nonvolatile memory 103 and the nonvolatile memory 203. In the example illustrated in FIG. 7, a serial number is provided as a list item to identify each device as a specific device. When a permission 703 is "Pull Only", only Pull is permitted. When the permission 703 is "Push Only", only Push is permitted. When the permission 703 is "Pull/Push", both Pull and Push are permitted. The serial number is an example of information for identifying each device, and is not limited thereto. As other examples, the MAC Address of each device may be used.

Determination procedures based on the transmission and reception destination list 701 will be described below. First, the device which has detected advertisement extracts the serial number from the advertisement information. Then, the device searches for a serial number 702 in the transmission and reception destination list 701 that matches the extracted serial number. When the extracted serial number exists in the transmission and reception destination list 701, the device refers to the permission 703 of the corresponding serial number 702. As described in the descriptions of T504 and T554, the device which has detected advertisement transmits a Bluetooth (registered trademark) connection request as a response according to the permission status of the permission 703. If the corresponding serial number does not exist in the transmission and reception destination list 701, the device notifies the user of the device which has detected advertisement to prompt the user to determine whether to permit Push or Pull. When the user permits Push or Pull, the device changes the permission 703 of the transmission and reception destination list 701. This completes descriptions of determination procedures based on the transmission and reception destination list 701.

<Detailed Operations of Mobile Phone>

Operations of the digital camera 1 and the mobile phone 2 will be described in detail below with reference to flowcharts.

Figure 8A:
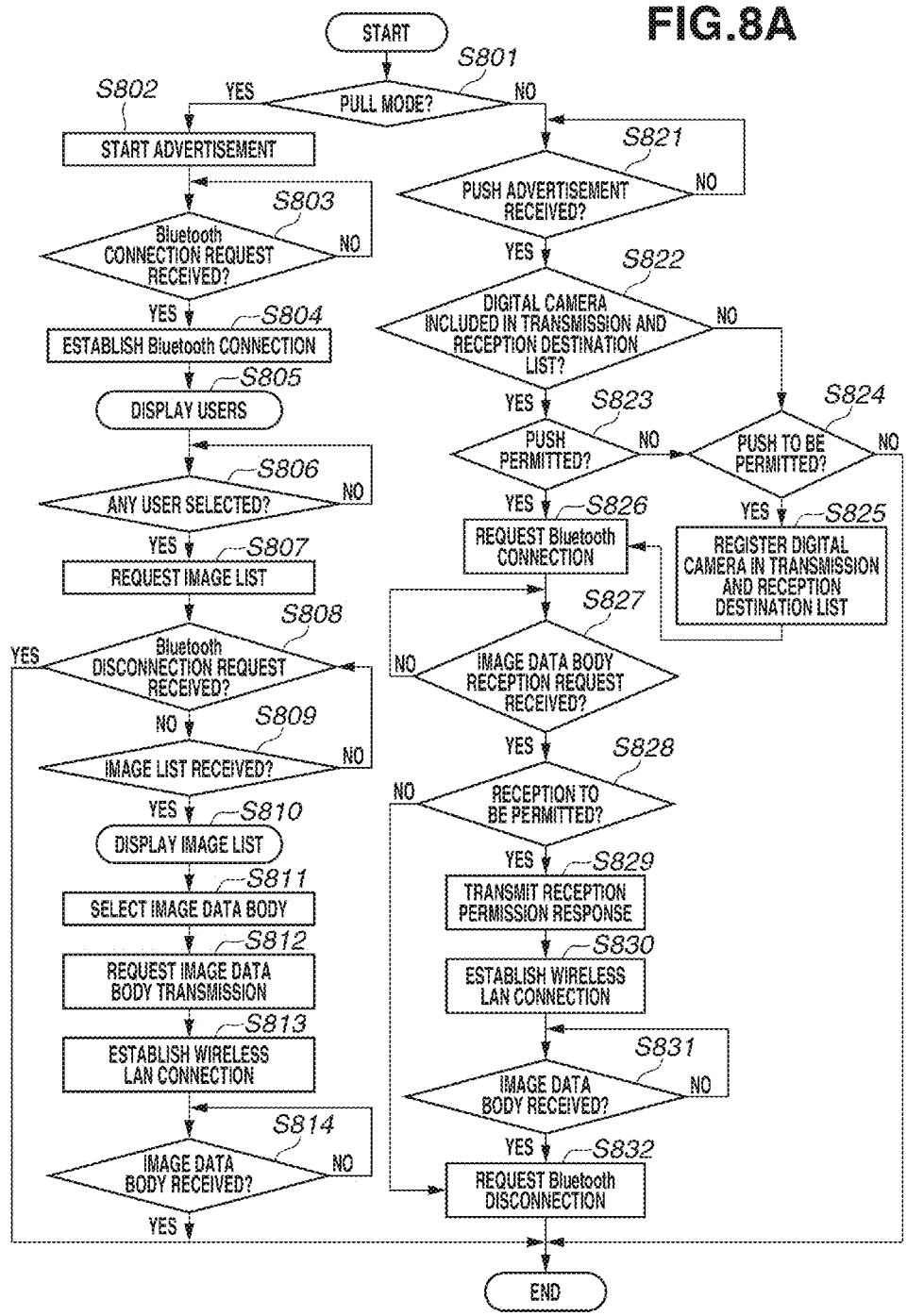

FIG. 8A is a flowchart illustrating operations of the mobile phone 2 according to the present exemplary embodiment. This flowchart is started when the camera communication application installed in the mobile phone 2 is activated and when setting of the Pull mode or the Push mode is enabled based on a user operation. The Bluetooth (registered trademark) unit 215 and the wireless LAN unit 211 of the mobile phone 2 are assumed to be operative when this flowchart is started.

Although, in the present exemplary embodiment, the mobile phone 2 requests Pull or waits for Push, the mobile phone 2 may request Push or wait for Pull.

In step S801, the control unit 201 determines whether the current mode is the Pull mode. Transition to the Pull mode is performed via a mode selection screen illustrated in FIG. 10A. When a "Pull Mode" button 1001 is specified through a user operation, the mobile phone 2 shifts to the Pull mode. When a "Push Mode" button 1002 is specified through a user operation, the mobile phone 2 shifts to the Push mode. When the control unit 201 determines that the current mode is the Pull mode (YES in step S801), the processing proceeds to step S802. When the control unit 201 determines that the current mode is not the Pull mode (NO in step S801), the processing proceeds to step S821. In step S821, the control unit 201 waits for Push advertisement.

A case where the control unit 201 advances the processing to step S802, i.e., a case where the mobile phone 2 is in the Pull mode will be described below.

In step S802, the control unit 201 starts advertisement toward peripheral devices via the Bluetooth (registered trademark) unit 215. At this timing, as described above, the mobile phone 2 adds the Pull information to the advertisement structure of the packet 601, and performs advertisement.

In step S803, the control unit 201 determines whether a Bluetooth (registered trademark) connection request is received from the digital camera 1. When the control unit 201 determines that the Bluetooth (registered trademark) connection request is received from the digital camera 1 (YES in step S803), the processing proceeds to step S804. On the other hand, when the control unit 201 determines that the Bluetooth (registered trademark) connection request is not received from the digital camera 1 (NO in step S803), the control unit 201 waits for reception of the connection request.

In step S804, the control unit 201 establishes a Bluetooth (registered trademark) connection with the digital camera 1.

In step S805, the control unit 201 displays on the display unit 206 the users of peripheral devices which have established a Bluetooth (registered trademark) connection. An example of screen display is illustrated in FIG. 10B. In the example illustrated in FIG. 10B, the user names of devices having established a Bluetooth (registered trademark) connection are displayed by icons 1031, and a text 1032 is displayed to prompt the user to select any one of the user names.

In step S806, the control unit 201 determines whether any one of the user names is selected from a user list displayed on the display unit 206. When the control unit 201 determines that a user name is selected (YES in step S806), the processing proceeds to step S807. On the other hand, when the control unit 201 determines that no user name is selected (NO in step S806), the control unit 201 waits until any one of the user names is selected.

In step S807, the control unit 201 transmits a request for an image list to the digital camera 1 via the Bluetooth (registered trademark) unit 215.

In step S808, the control unit 201 determines whether a Bluetooth (registered trademark) disconnection request is received from the digital camera 1. When the control unit 201 determines that the Bluetooth (registered trademark) disconnection request is not received (NO in step S808), the processing proceeds to step S809. On the other hand, when the control unit 201 determines that the Bluetooth (registered trademark) disconnection request is received (YES in step S808), the processing exits this flowchart.

In step S809, the control unit 201 determines whether an image list is received from the digital camera 1 via the Bluetooth (registered trademark) unit 215. When the control unit 201 determines that the image list is received (YES in step S809), the processing proceeds to step S810. On the other hand, when the control unit 201 determines that the image list is not received (NO in step S809), the processing returns to step S808. When receiving the image list from the digital camera 1, the control unit 201 also receives the ID of the image list to identify the image data body, and stores the ID in the work memory 204. Alternatively, the ID may be included in the image list.

In step S810, the control unit 201 displays on the display unit 206 the image list received from the digital camera 1. An example of screen display is illustrated in FIG. 10C. In the example illustrated in FIG. 10C, a thumbnail 1033 is displayed in three columns. Other image data can be displayed by performing a scroll operation in the vertical direction. The example further displays a connecting apparatus 1034 with which a Bluetooth (registered trademark) connection is established.

Upon reception of a user operation for selecting a desired thumbnail from the image list, in step S811, the control unit 210 stores in the work memory 204 the ID corresponding to the thumbnail selected by the user. In the example illustrated in FIG. 10C, an icon 1035 is displayed near the selected thumbnail.

Upon detection of the completion of the selection by the user pressing an End button 1036, in step S812, the control unit 201 transmits an image data body transmission request to the digital camera 1 via the Bluetooth (registered trademark) unit 215. At this timing, the control unit 201 reads the ID corresponding to the thumbnail selected in step S811 from the work memory 204, and then transmits the ID together with this request.

In step S813, the control unit 201 establishes a wireless LAN connection with the digital camera 1. As described above, since the simple AP is activated on the side of the digital camera 1, the control unit 201 receives the SSID and the encryption key of the simple AP via the Bluetooth (registered trademark) unit 215 to participate in the wireless LAN network. Then, the control unit 201 performs device discovery, and identifies the digital camera 1 to establish a wireless LAN connection.

In step S814, the control unit 201 determines whether an image data body is received from the digital camera 1. When the control unit 201 determines that the image data body is received (YES in step S814), the processing exits this flowchart. When the control unit 201 determines that the image data body is not received (NO in step S814), the control unit 201 waits for reception of the image data body.

This completes descriptions of the processing by the mobile phone 2 in the Pull mode.

A case where the mobile phone 2 waits for the Push mode, i.e., a case where the control unit 201 advances the processing to step S821 will be described below.

In step S821, the control unit 201 determines whether Push advertisement is received. When the control unit 201 determines that Push advertisement is received (YES in step S821), the control unit 201 stores the advertisement information in the work memory 204, and the processing proceeds to step S822. On the other hand, when the control unit 201 determines that Push advertisement is not received (NO in step S821), the control unit 201 waits for reception of Push advertisement.

In step S822, the control unit 201 determines whether the digital camera 1 is included in the transmission and reception destination list 701. When the control unit 201 determines that the digital camera 1 is included the transmission and reception destination list 701 (YES in step S822), the processing proceeds to step S823. When the control unit 201 determines that the digital camera 1 is not included the transmission and reception destination list 701 (NO in step S822), the processing proceeds to step S824.

In step S823, referring to the transmission and reception destination list 701 stored in the nonvolatile memory 203, the control unit 201 determines whether Push is permitted for the digital camera 1. When the control unit 201 determines that Push is permitted (YES in step S823), the processing proceeds to step S826. On the other hand, when the control unit 201 determines that Push is not permitted (NO in step S823), the processing proceeds to step S824.

In step S824, the control unit 201 displays on the display unit 206 a message asking whether to permit Push, and determines whether to permit Push based on a user operation. An example of screen display is illustrated in FIG. 10D. In the example illustrated in FIG. 10D, a message 1061 indicates that a Push request is received from a user name 1062. The user is able to refuse or permit Push by pressing a Refuse button 1063 or a Permit button 1064, respectively. When the control unit 201 determines that Push is to be permitted (YES in step S824), the processing proceeds to step S825. When the control unit 201 determines that Push is not to be permitted (NO in step S824), the processing exits this flowchart.

In step S825, the control unit 201 registers the digital camera 1 in the transmission and reception destination list 701 stored in the nonvolatile memory 203, and the processing proceeds to step S826.

In step S826, the control unit 201 transmits a Bluetooth (registered trademark) connection request to the digital camera 1 via the Bluetooth (registered trademark) unit 215, and then a Bluetooth (registered trademark) connection is established.

In step S827, the control unit 201 determines whether an image data body reception request is received from the digital camera 1. When the control unit 201 determines that the image data body reception request is received (YES in step S827), the processing proceeds to step S828. When the control unit 201 determines that the image data body reception request is not received (NO in step S827), the control unit 201 waits for reception of the image data body reception request.

Figure 10E:
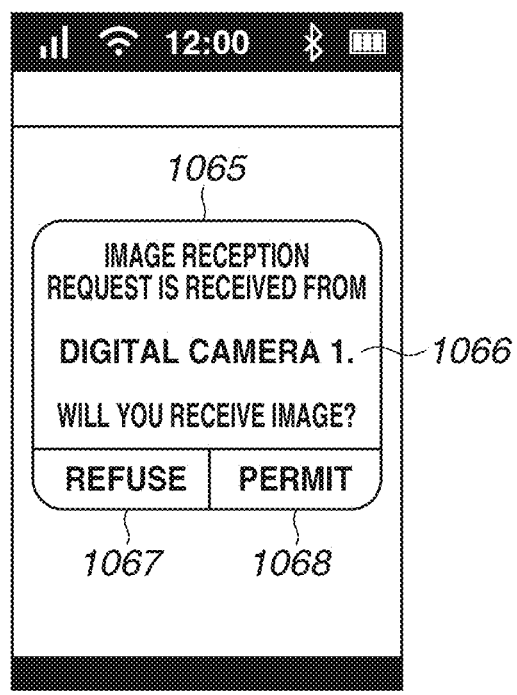

In step S828, the control unit 201 displays on the display unit 206 a message asking whether to receive the image data body from the digital camera 1, and determines whether to receive the image data body based on a user operation. An example of screen display is illustrated in FIG. 10E. In the example illustrated in FIG. 10E, a message 1065 indicates that the image reception request is received from a user name 1066. The user is able to refuse or permit accepting the image reception request by pressing a Refuse button 1067 or a Permit button 1068, respectively. When the control unit 201 determines that the reception is to be permitted (YES in step S828), the processing proceeds to step S829. When the control unit 201 determines that the reception is not to be permitted (NO in step S828), the processing proceeds to step S832.

In step S829, the control unit 201 transmits a reception permission response to the digital camera 1 via the Bluetooth (registered trademark) unit 215.

In step S830, the control unit 201 establishes a wireless LAN connection with the digital camera 1. Specific processing is similar to the processing in step S813.

In step S831, the control unit 201 determines whether the image data body is received via the wireless LAN unit 211. When the control unit 201 determines that the image data body is received (YES in step S831), the processing proceeds to step S832. On the other hand, when the control unit 201 determines that the image data body is not received (NO in step S831), the control unit 201 waits for reception of the image data body.

In step S832, the control unit 201 transmits a Bluetooth (registered trademark) disconnection request to the digital camera 1 via the Bluetooth (registered trademark) unit 215.

This completes descriptions of the processing by the mobile phone 2 in the Push mode. In the present exemplary embodiment, since the mobile phone 2 serves as the reception side, the mobile phone 2 performs advertisement with Pull information added thereto toward the digital camera 1 or waits for advertisement with Push information added thereto.

<Detailed Operations of Digital Camera>

Operations of the digital camera 1 will be described below. FIG. 8B is a flowchart illustrating operations of the digital camera 1 according to the present exemplary embodiment. This flowchart is started when setting of the Pull mode or the Push mode is enabled in the digital camera 1 based on a user operation. It is assumed that, when this flowchart is started, the Bluetooth (registered trademark) unit 112 and the wireless LAN unit 111 of the digital camera 1 are operative.

Although, in the present exemplary embodiment, the digital camera 1 requests Push or waits for Pull for the sake of simplification, the processing is not limited thereto. The digital camera 1 may wait for Push or request Pull.

In step S851, the control unit 101 determines whether the current mode is the Push mode. Transition to the Push mode is performed via a mode selection screen illustrated in FIG. 9A. When a "Pull Mode" button 901 is pressed through a user operation, the digital camera 1 shifts to the Pull mode. When a "Push Mode" button 902 is pressed, the digital camera 1 shifts to the Push mode. When the control unit 101 determines that the current mode is the Push mode (YES in step S851), the processing proceeds to step S852. On the other hand, when the control unit 101 determines that the current mode is not the Push mode (NO in step S851), the processing proceeds to step S871. In step S871, the control unit 101 waits for Pull advertisement.

First of all, a case where the user selects the Push mode, i.e., a case where the control unit 101 advances the processing to step S852 will be described below.

In step S852, the control unit 101 starts advertisement toward peripheral devices via the Bluetooth (registered trademark) unit 112. At this timing, as described above, the digital camera 1 adds Push information to the advertisement structure of the packet 601, and performs advertisement.

In step S853, the control unit 101 determines whether a Bluetooth (registered trademark) connection request is received from the mobile phone 2. When the control unit 101 determines that the Bluetooth (registered trademark) connection request is received (YES in step S853), the processing proceeds to step S854. When the control unit 101 determines that the Bluetooth (registered trademark) connection request is not received (NO in step S853), the control unit 101 waits for reception of the connection request.

In step S854, the control unit 101 establishes a Bluetooth (registered trademark) connection with the mobile phone 2.

In step S855, the control unit 101 displays on the display unit 106 the users of peripheral devices which have established a Bluetooth (registered trademark) connection. An example of screen display is illustrated in FIG. 9B. In the example illustrated in FIG. 9B, the control unit 101 displays user names of peripheral devices having established a Bluetooth (registered trademark) connection by using an icon 931, and displays a guidance 932 to prompt the user to select any one of the user names.

In step S856, the control unit 101 determines whether any one of the user names is selected from the user list displayed on the display unit 106. When the control unit 101 determines that any one of the user names is selected (YES in step S856), the processing proceeds to step S857. When the control unit 101 determines that no user name is selected (NO in step S856), the control unit 101 waits until any one of the user names is selected.

In step S857, the control unit 101 transmits an image data body reception request to the mobile phone 2 via the Bluetooth (registered trademark) unit 112. As described above, the user may prespecify image data to be transmitted to the mobile phone 2, or specify image data after selection of an image data body transmission destination.

In step S858, the control unit 101 determines whether a Bluetooth (registered trademark) disconnection request is received from the mobile phone 2. When the control unit 101 determines that the Bluetooth (registered trademark) disconnection request is not received (NO in step S858), the processing proceeds to step S859. On the other hand, when the control unit 101 determines that the Bluetooth (registered trademark) disconnection request is received (YES in step S858), the processing exits the flowchart.

In step S859, the control unit 101 determines whether a reception permission response is received from the mobile phone 2 via the Bluetooth (registered trademark) unit 112. When the control unit 101 determines that the reception permission response is received (YES in step S859), the processing proceeds to step S860. When the control unit 101 determines that the reception permission response is not received (NO in step S859), the processing returns to step S858.

In step S860, the control unit 101 activates its simple AP to establish a wireless LAN connection with the mobile phone 2. This processing is similar to the above-described processing.

In step S861, the control unit 101 transmits the image data body to the mobile phone 2 via the wireless LAN unit 111. When the control unit 101 determines that the transmission has been completed, the control unit 101 disconnects the wireless LAN connection with the mobile phone 2, and deactivates the simple AP function.

This completes descriptions of processing by the digital camera 1 in the Push mode.

A case where the digital camera 1 waits for the Pull mode, i.e., a case where the control unit 101 advances the processing to step S871 will be described below.

In step S871, the control unit 101 determines whether Pull advertisement is received. When the control unit 101 determines that Pull advertisement is received (YES in step S871), the control unit 101 stores the advertisement information in the work memory 104, and the processing proceeds to step S872. On the other hand, when the control unit 101 determines that Pull advertisement is not received (NO in step S871), the control unit 101 waits for reception of Pull advertisement.

In step S872, the control unit 101 determines whether the mobile phone 2 is included in the transmission and reception destination list 701. When the control unit 101 determines that the mobile phone 2 is included the transmission and reception destination list 701 (YES in step S872), the processing proceeds to step S873. When the control unit 101 determines that the mobile phone 2 is not included the transmission and reception destination list 701 (NO in step S872), the processing proceeds to step S874.

In step S873, referring to the transmission and reception destination list 701 stored in the nonvolatile memory 103, the control unit 101 determines whether Pull is permitted for the mobile phone 2. When the control unit 101 determines that Pull is permitted (YES in step S873), the processing proceeds to step S876. On the other hand, when the control unit 101 determines that Push is not permitted (NO in step S873), the processing proceeds to step S874.

Figure 9C:
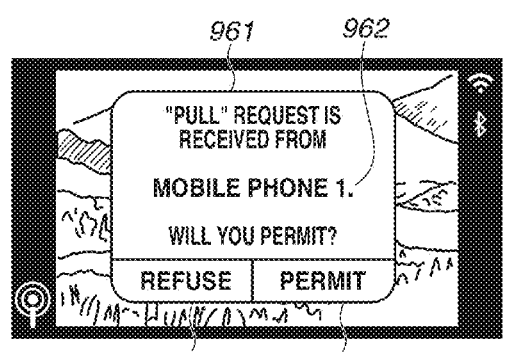

In step S874, the control unit 101 displays on the display unit 106 a message asking whether to permit Pull, and determines whether to permit Pull based on a user operation. An example of screen display is illustrated in FIG. 9C. In the example illustrated in FIG. 9C, a message 961 indicates that a Pull request is received from a user name 962. The user is able to refuse or permit Pull by pressing a Refuse button 963 or a Permit button 964, respectively. When the control unit 101 determines that Pull is to be permitted through a user input (YES in step S874), the processing proceeds to step S875. On the other hand, when the control unit 101 determines that Pull is not to be permitted through a user input (NO in step S874), the processing exits this flowchart.

In step S875, the control unit 101 registers the mobile phone 2 in the transmission and reception destination list 701 stored in the nonvolatile memory 103, and the processing proceeds to step S876.

In step S876, the control unit 101 transmits a Bluetooth (registered trademark) connection request to the mobile phone 2 via the Bluetooth (registered trademark) unit 112, and then a Bluetooth (registered trademark) connection is established.

In step S877, the control unit 101 determines whether a request for an image list is received from the mobile phone 2. When the control unit 101 determines that the request is received (YES in step S877), the processing proceeds to step S878. On the other hand, when the control unit 101 determines that the request is not received (NO in step S877), the control unit 101 waits for reception of the request for an image list.

Figure 9D:
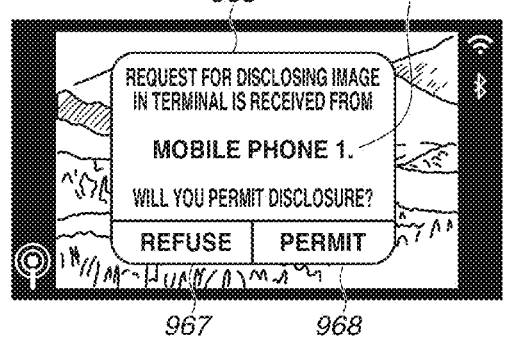

In step S878, the control unit 101 displays on the display unit 106 a message asking whether to permit transmission of the image list, and determines whether to permit the transmission of the image list based on a user operation. An example of screen display is illustrated in FIG. 9D. In the example illustrated in FIG. 9D, a message 965 indicates that an image list transmission request is received from a user name 966. The user is able to refuse or permit the image list transmission request by pressing a Refuse button 967 or a Permit button 968, respectively. When the control unit 101 determines that the transmission is to be permitted (YES in step S878), the processing proceeds to step S879. On the other hand, when the control unit 101 determines that the transmission is not to be permitted (NO in step S878), the processing proceeds to step S883.

In step S879, the control unit 101 transmits the image list to the mobile phone 2 via the Bluetooth (registered trademark) unit 112. At this timing, the control unit 101 transmits an ID for identifying the image data body of the digital camera 1, together with the image list.

In step S880, the control unit 101 determines whether an image data body transmission request is received from the mobile phone 2 via the Bluetooth (registered trademark) unit 111. When the control unit 101 determines that the image data body transmission request is received (YES in step S880), the processing proceeds to step S881. At this timing, the control unit 101 stores in the work memory 104 the ID received together with the image data body transmission request. On the other hand, when the control unit 101 determines that the image data body transmission request is not received (NO in step S880), the control unit 101 waits for reception of the image data body transmission request.

In step S881, the control unit 101 activates its simple AP to establish a wireless LAN connection with the mobile phone 2. This processing is similar to the above-described processing.

In step S882, based on the ID stored in the work memory 104, the control unit 101 transmits the image data body via the wireless LAN unit 111. When the control unit 101 determines that the transmission of the image data body has been completed, the control unit 101 disconnects the wireless LAN communication with the mobile phone 2, and deactivates the simple AP function.

In step S883, the control unit 101 transmits a Bluetooth (registered trademark) disconnection request to the mobile phone 2 via the Bluetooth (registered trademark) unit 112.

This completes descriptions of the processing by the digital camera 1 in the Push mode. In the present exemplary embodiment, since the digital camera 1 serves as the transmission side, the digital camera 1 performs advertisement with Push information added thereto toward the mobile phone 2 or wait for advertisement with Pull information added thereto.

As described above, according to the present exemplary embodiment, it is possible to realize a communication system capable of supporting both the Pull mode and the Push mode.

Other exemplary embodiments will be described below. In the first exemplary embodiment, the digital camera 1 is configured to form a network to directly communicate with the mobile phone 2. On the other hand, the exemplary embodiments of the present invention are applicable even to a connection mode in which apparatuses communicate with each other in advance to determine which apparatus serves as an AP, as in the case of Wi-Fi Direct.

In the first exemplary embodiment, communication before transmitting image data is performed based on Bluetooth (registered trademark). This is because Bluetooth is able to operate, although at a lower transmission rate, on lower consumption power than wireless LAN. Exemplary embodiments of the present invention are not limited to the combination of Bluetooth (registered trademark) and wireless LAN. At least either one may be changed to other communication method.

Although, in the first exemplary embodiment, a permission status is registered in the transmission and reception destination list 701, the configuration is not limited thereto. A refusal status may be registered in the transmission and reception destination list 701.

Although, in the first exemplary embodiment, the transmission and reception destination list 701 is stored in each device, the configuration is not limited thereto. For example, the transmission and reception destination list 701 is provided, for example, on the network, and devices refer to the server.

Although, in the first exemplary embodiment, each time a partner apparatus, which the user has never communicated with, is permitted to communicate, the partner apparatus is registered in the transmission and reception destination list, the configuration is not limited thereto. The user may manually register the partner apparatus before performing communication.

Although, in the first exemplary embodiment, the imaging status of the digital camera 1 is not taken into consideration, the configuration is not limited thereto. When the control unit 101 detects advertisement including the Pull information or Push information while the digital camera 1 performs imaging, the control unit 101 may first capture an image giving a higher priority to imaging, and, after completion of the imaging, may determine whether to respond to advertisement.

Although, in the first exemplary embodiment, the status of the recording medium 110 of the digital camera 1 is not taken into consideration, the configuration is not limited thereto. When no image is stored in the recording medium 110 of the digital camera 1, the control unit 101 may disable selection of the Push mode.

Exemplary embodiments of the present invention are implemented also by performing the following processing. Specifically, software (program) for implementing the functions of the above-described exemplary embodiments is supplied to a system or an apparatus via a network or various storage media, and a computer (or CPU or micro processing unit (MPU), etc.) of the system or the apparatus reads and executes the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-223526 filed Oct. 28, 2013, which is hereby incorporated by reference herein in its entirety.

What is claimed is:

1. A communication apparatus comprising:
   at least one processor;
   at least one communication interface; and
   at least one operation interface;
   wherein the at least one processor is configured to:
   transmit, via the at least one communication interface, a first notification signal for providing notification of an existence of the communication apparatus to a second apparatus using a first communication method;
   receive, via the at least one communication interface, a second notification signal that has been transmitted from the second apparatus for providing notification of an existence of the second apparatus;
   select, via the at least one operation interface, a mode in which data stored in a memory of the communication apparatus is transmitted to the external apparatus to which the connection has been established by the at least one processor, wherein the selected mode is a Push mode or a Pull mode;
   determine, on a basis of the mode selected by the at least one processor, whether to establish, by the at least one processor, a connection to an external apparatus that has responded to the first notification signal transmitted by the at least one processor or to establish, by the at least one processor, a connection to an external apparatus that has transmitted the second notification signal received by the at least one processor; and
   establish, via the at least one communication interface, the determined connection to the corresponding external apparatus using a second communication method.

2. The communication apparatus according to claim 1, wherein the Push mode includes a mode in which data transmission is executed on a basis of an operation performed on the communication apparatus.

3. The communication apparatus according to claim 2, wherein the connection to the external apparatus that has responded to the first notification signal transmitted by the at least one processor is established by the at least one processor in a case where the Push mode is selected by the at least one processor.

4. The communication apparatus according to claim 2, wherein the first notification signal includes information for causing the external apparatus to recognize that a communication is to be performed using the Push mode.

5. The communication apparatus according to claim 1, wherein the Pull mode includes a mode in which data transmission is executed on a basis of a request from the external apparatus.

6. The communication apparatus according to claim 5, wherein the connection to the external apparatus that has transmitted the second notification signal received by the at least one processor is established by the at least one processor in a case where the Push mode is selected by the at least one processor.

7. The communication apparatus according to claim 5, wherein the second notification signal includes information for causing the communication apparatus to recognize that communication is to be performed using the Pull mode.

8. The communication apparatus according to claim 1,
   wherein the first communication method is based on Bluetooth (registered trademark), and
   wherein the first notification signal and the second notification signal are advertisement signals.

9. The communication apparatus according to claim 1, wherein the second communication method is based on a wireless local area network (LAN).

10. The communication apparatus according to claim 1, wherein the communication apparatus includes a camera.

11. The communication apparatus according to claim 1, wherein the external apparatus is a mobile phone.

12. The communication apparatus according to claim 1, wherein the external apparatus is a tablet device.

13. The communication apparatus according to claim 1, wherein the communication apparatus operates as an access point of a wireless local area network (LAN).

14. A method for controlling a communication apparatus having at least one processor, at least one communication interface and at least one operation interface, the method comprising:
   transmitting, by the at least one processor via the at least one communication interface of the communication apparatus, a first notification signal for providing notification of an existence of the communication apparatus to a second apparatus using a first communication method;

receiving, by the at least one processor via the at least one communication interface, a second notification signal that has been transmitted from the second apparatus for providing notification of an existence of the second apparatus;

selecting, by the at least one processor via the at least one operation interface of the communication apparatus, a mode in which data stored in a memory of the communication apparatus is transmitted to the external apparatus to which the connection has been established by the at least one processor of the communication apparatus, wherein the selected mode is a Push mode or a Pull mode;

determining, by the at least one processor on a basis of the mode selected by the at least one processor, whether to establish, by the at least one processor, a connection to an external apparatus that has responded to the first notification signal transmitted by the at least one processor or to establish, by the at least one processor, a connection to an external apparatus that has transmitted the second notification signal received by the at least one processor; and establishing, by the at least one processor via the at least one communication interface, the determined connection to the corresponding external apparatus using a second communication method.

15. A non-transitory computer-readable storage medium storing a program that causes a processor to execute a method for controlling a communication apparatus having at least one processor, at least one communication interface and at least one operation interface, the method comprising:

transmitting, by the at least one processor via the at least one communication interface of the communication apparatus, a first notification signal for providing notification of an existence of the communication apparatus to a second apparatus using a first communication method;

receiving, by the at least one processor via the at least one communication interface, a second notification signal that has been transmitted from the second apparatus for providing notification of an existence of the second apparatus;

selecting, by the at least one processor via the at least one operation interface of the communication apparatus, a mode in which data stored in a memory of the communication apparatus is transmitted to the external apparatus to which the connection has been established by the at least one processor of the communication apparatus, wherein the selected mode is a Push mode or a Pull mode;

determining, by the at least one processor on a basis of the mode selected by the at least one processor, whether to establish, by the at least one processor, a connection to an external apparatus that has responded to the first notification signal transmitted by the at least one processor or to establish, by the at least one processor, a connection to an external apparatus that has transmitted the second notification signal received by the at least one processor; and establishing, by the at least one processor via the at least one communication interface, the determined connection to the corresponding external apparatus using a second communication method.

\* \* \* \* \*